United States Patent
Yates

(10) Patent No.: US 10,724,314 B1
(45) Date of Patent: Jul. 28, 2020

(54) METHOD AND APPARATUS FOR COLLECTION, TREATMENT, AND RECYCLING OF OILFIELD DRILLING FLUIDS AND WASTEWATER

(71) Applicant: RIO RESOURCES LLC, Bulverde, TX (US)

(72) Inventor: Dale Ross Yates, Spring Branch, TX (US)

(73) Assignee: Rio Resources LLC, New Braunfels, TX (US)

( * ) Notice: Subject to any disclaimer, the term of this patent is extended or adjusted under 35 U.S.C. 154(b) by 0 days.

(21) Appl. No.: 16/109,563

(22) Filed: Aug. 22, 2018

Related U.S. Application Data

(63) Continuation of application No. 15/009,543, filed on Jan. 28, 2016, now abandoned, which is a continuation-in-part of application No. 14/201,504, filed on Mar. 7, 2014, now abandoned.

(60) Provisional application No. 61/801,302, filed on Mar. 15, 2013.

(51) Int. Cl.
| | |
|---|---|
| E21B 21/06 | (2006.01) |
| C02F 11/121 | (2019.01) |
| C02F 1/40 | (2006.01) |
| C02F 1/74 | (2006.01) |
| C02F 101/32 | (2006.01) |
| C02F 101/20 | (2006.01) |
| C02F 101/10 | (2006.01) |
| C02F 103/10 | (2006.01) |

(52) U.S. Cl.
CPC .............. *E21B 21/065* (2013.01); *C02F 1/40* (2013.01); *C02F 1/74* (2013.01); *C02F 11/121* (2013.01); *E21B 21/066* (2013.01); *C02F 2101/10* (2013.01); *C02F 2101/20* (2013.01); *C02F 2101/322* (2013.01); *C02F 2103/10* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 3,510,006 A | * | 5/1970 | Cheysson ............ A01K 1/0606 210/522 |
| 3,666,108 A | | 5/1972 | in 't Veld |
| 3,849,310 A | | 11/1974 | Condolios et al. |
| | | | (Continued) |

OTHER PUBLICATIONS

Osamor et al., "Oil/Water Separation: State-Of-The-Art", E.P.A., published 1978, 6 total pages.
(Continued)

*Primary Examiner* — Jonathan M Peo
(74) *Attorney, Agent, or Firm* — Pizarro Allen PC

(57) ABSTRACT

Systems and methods of collecting, treating, and recycling oilfield drilling fluids, used oilfield water, and other wastewater are disclosed. A separator may be used to separate a fluid mixture into one or more liquids and one or more solids. Water, oil, or other liquids may be recovered from the separator and further processed by aeration, filtration, and/or pasteurization, making them suitable for reuse in oilfield drilling and/or fracking operations or other industrial applications, such as truck or equipment washing. Sludge from the separator may be dried to produce dried solids, which may also be used for various applications, such as road base.

20 Claims, 5 Drawing Sheets

(56) References Cited

U.S. PATENT DOCUMENTS

| | | | |
|---|---|---|---|
| 4,482,459 A | 11/1984 | Shiver | |
| 4,783,272 A * | 11/1988 | Patterson | B01D 21/10 |
| | | | 210/787 |
| 5,132,025 A | 7/1992 | Hays | |
| 5,316,664 A * | 5/1994 | Gregoli | B01F 3/0811 |
| | | | 208/390 |
| 5,908,040 A * | 6/1999 | Defraites, Jr. | B63B 57/02 |
| | | | 134/10 |
| 6,113,786 A * | 9/2000 | Burke | C02F 3/286 |
| | | | 210/603 |
| 7,527,736 B2 | 5/2009 | Shafer et al. | |
| 8,105,488 B2 | 1/2012 | Shafer et al. | |
| 8,529,763 B2 | 9/2013 | Shafer et al. | |
| 8,790,514 B2 | 7/2014 | Shafer et al. | |
| 8,877,690 B2 | 11/2014 | Keister | |
| 9,284,206 B2 | 3/2016 | Presutti | |
| 2003/0047499 A1 | 3/2003 | Levitin | |
| 2004/0031750 A1 | 2/2004 | Larsson | |
| 2005/0274669 A1 | 12/2005 | Marchesseault et al. | |
| 2007/0102359 A1 * | 5/2007 | Lombardi | B01D 17/085 |
| | | | 210/639 |
| 2008/0156709 A1 | 7/2008 | Johnson | |
| 2008/0237141 A1 | 10/2008 | Kerfoot | |
| 2009/0014392 A1 * | 1/2009 | McEwen | B01D 17/0211 |
| | | | 210/744 |
| 2009/0032446 A1 | 2/2009 | Wiemers et al. | |
| 2009/0183922 A1 * | 7/2009 | Smith | C02F 1/34 |
| | | | 175/66 |
| 2010/0038310 A1 * | 2/2010 | Shafer | C02F 9/00 |
| | | | 210/605 |
| 2011/0272362 A1 * | 11/2011 | Sikes | C02F 1/56 |
| | | | 210/705 |
| 2013/0048562 A1 * | 2/2013 | Keister | C01D 3/06 |
| | | | 210/638 |
| 2013/0203144 A1 * | 8/2013 | Josse | C02F 11/04 |
| | | | 435/167 |
| 2013/0341269 A1 * | 12/2013 | Bouchet | C02F 3/28 |
| | | | 210/631 |
| 2014/0021033 A1 | 1/2014 | Frick | |
| 2014/0116967 A1 | 5/2014 | Smith et al. | |
| 2014/0124453 A1 | 5/2014 | Presutti | |

OTHER PUBLICATIONS

Kumar et al., "A review of permissible limits of drinking water", Indian J. Occup. Environ. Med., Jan.-Apr. 2012; 16(1), pp. 40-44, 11 total pages.

International Publication No. WO/1997/023264 Issued Jul. 3, 1997 in International Patent Application No. PCT/US1995/016801 (20 pages).

* cited by examiner

D' CLAIRE OIL WATER SEPARATOR
SCALE: 1" = 5'

METHOD AND APPARATUS FOR COLLECTION, TREATMENT, AND RECYCLING OF OILFIELD DRILLING FLUIDS AND WASTEWATER

CROSS REFERENCE TO RELATED APPLICATIONS

This application is a continuation of U.S. patent application Ser. No. 15/009,543 filed Jan. 28, 2016, which is a continuation-in-part of U.S. patent application Ser. No. 14/201,504 filed Mar. 7, 2014, which claims priority to U.S. Provisional Patent Application No. 61/801,302 filed Mar. 15, 2013, the disclosure of each of which is incorporated herein by reference.

FIELD

This application relates generally to the field of oilfield drilling fluids and wastewater.

BACKGROUND

In the field of oil and gas well drilling, drilling fluids are used to drill wells from which hydrocarbons may be extracted. In the drilling process, water may be produced as well as hydrocarbons. Additionally, if hydraulic fracturing or "fracking" processes are used to produce hydrocarbons, frac flow back water may also be produced. Such processes may involve very large amounts of water, which may be very expensive and consume water resources that may be in limited supply. There is a need for a method to collect, treat, and recycle such drilling fluids, produced water, and frac flow back water so that recovered water may be reused. Similarly, there is a need for an improved method and apparatus for treating wastewater so that it may be reused.

SUMMARY

In some embodiments, a method of collecting, treating, and recycling oilfield drilling fluids and used oilfield water may include: receiving oilfield drilling fluids; receiving used oilfield water as input water; blending the input water with the oilfield drilling fluids to form a blended mixture; transferring the blended mixture into an oil/water separator; operating the separator to separate the blended mixture into oil, water, and sludge; removing at least some of the oil from a top portion of the separator; removing at least some of the sludge from a bottom portion of the separator; removing at least some of the water (hereafter, recovered water) from the separator to an aeration tank; aerating the recovered water in the aeration tank; filtering the recovered water; and pasteurizing the recovered water. In some embodiments, after the aerating and filtering, the recovered water may comprise brine water that is substantially free of hydrocarbons and suspended and dissolved solids but has one or more salts remaining therein.

In some embodiments, the method may include extracting solids from the aeration tank (hereafter, the first aeration tank) and passing the solids to a second aeration tank; diverting a portion of the recovered water exiting the first aeration tank into the second aeration tank; washing the solids in the second aeration tank with the portion of the recovered water in order to remove remaining hydrocarbons from the solids; passing the solids to a dryer; and drying the solids in the dryer.

In some embodiments, a separator may include: a tank; a funnel disposed in the tank; an inlet conduit configured for injecting a fluid mixture into an interior portion of the funnel, the fluid mixture comprising one or more liquids and one or more solids; a baffle configured such that the fluid mixture impinges on the baffle; a sludge outlet conduit configured for receiving sludge from a bottom portion of the funnel, the sludge comprising some of the one or more liquids and some of the one or more solids; and a first outlet conduit configured for removing at least some of the one or more liquids from the tank; wherein the funnel is configured to permit at least a portion of the one or more liquids to flow over an open rim of the funnel and into a space between the funnel and an interior wall of the tank.

In some embodiments, a system for collecting, treating, and recycling oilfield drilling fluids and used oilfield water may include: a drilling fluid tank configured for receiving oilfield drilling fluids; a water tank configured for receiving used oilfield water as input water; a conduit configured for blending the input water with the oilfield drilling fluids to form a blended mixture; an oil/water separator configured for receiving the blended mixture and separating the blended mixture into oil, water, and sludge; an oil outlet configured for removing at least some of the oil from a top portion of the separator; a sludge outlet configured for removing at least some of the sludge from a bottom portion of the separator; a water outlet configured for removing at least some of the water (hereafter, recovered water) from the separator; an aeration tank configured to receive the recovered water from the separator and aerate the recovered water; a filter configured to receive the recovered water and remove at least some particles from the recovered water; and a pasteurizer configured to receive the recovered water and pasteurize the recovered water.

In some embodiments, a system for collecting, treating, and recycling oilfield drilling fluids and used oilfield water may include: a drilling fluid tank configured for receiving oilfield drilling fluids; a water tank configured for receiving used oilfield water as input water; a conduit configured for blending the input water with the oilfield drilling fluids to form a blended mixture; an oil/water separator configured for receiving the blended mixture and separating the blended mixture into oil, water, and sludge; an oil outlet configured for removing at least some of the oil from a top portion of the separator; a sludge outlet configured for removing at least some of the sludge from a bottom portion of the separator; a water outlet configured for removing at least some of the water (hereafter, recovered water) from the separator; a first aeration tank configured to receive the recovered water from the separator and aerate the recovered water; a second aeration tank configured to receive solids from the first aeration tank, a portion of the recovered water from the first aeration tank, and the at least some of the sludge from the separator; a dryer configured to receive the at least some of the sludge and the solids from the second aeration tank and dry the at least some of the sludge and the solids; a filter configured to receive the recovered water from the first aeration tank and remove at least some particles from the recovered water; and a pasteurizer configured to receive the recovered water and pasteurize the recovered water.

In some embodiments, a separator may include a tank; a funnel disposed in the tank; a water collection tube disposed about the funnel, the water collection tube having one or more inlets configured to receive water from the tank; and a conduit configured for extracting water from the water collection tube.

DETAILED DESCRIPTION

As used herein, the following terms should be understood to have the indicated meanings:

When an item is introduced by "a" or "an," it should be understood to mean one or more of that item.

"Comprises" means includes but is not limited to.

"Comprising" means including but not limited to.

"Having" means including but not limited to.

The present disclosure is directed to systems and methods for collection, treatment, and recycling of fluids containing water, such as oilfield drilling fluids (also known as drilling mud), produced water, and frac flow back water. Although a primary embodiment described herein may involve oilfield drilling fluids, persons of ordinary skill in the art will understand that systems and methods as described herein, or portions thereof, may also be used to process other wastewater, such as sewage or wastewater from other industrial processes, for example. Therefore, the invention is not limited to the particular embodiments described herein.

Figure 1:
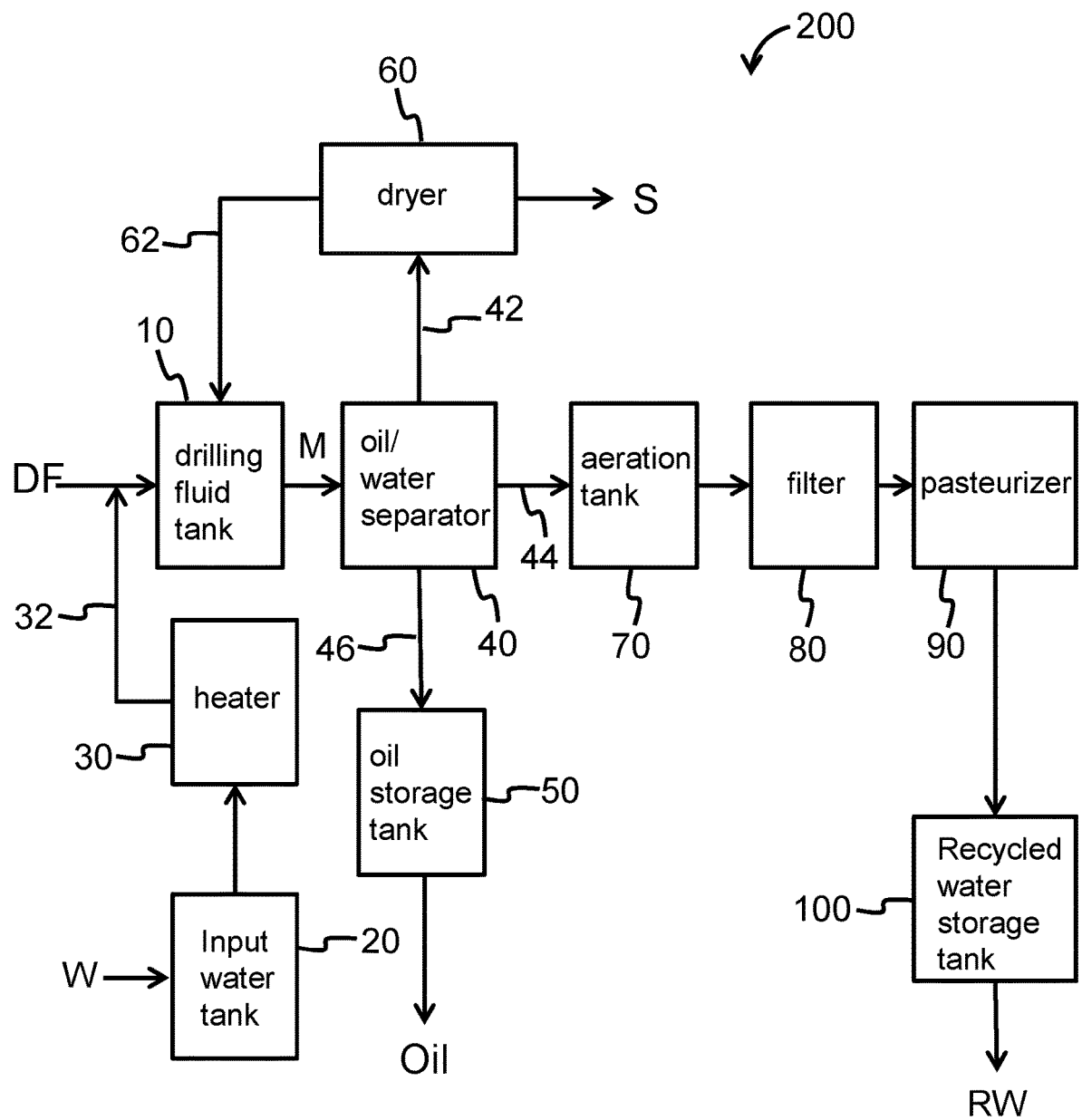
FIG. 1 is a schematic diagram illustrating a method and apparatus for collecting, treating, and recycling oilfield drilling fluids, produced water, and frac flow back water.

As shown in the attached FIG. 1, a system 200 may have a drilling fluid tank 10 configured for receiving oilfield drilling fluids DF and a water tank 20 configured for receiving produced water and/or frac flow back water (collectively indicated as W, or input water) from oilfield drilling operations, for example. Drilling fluids DF and input water W may be delivered to system 200 by any suitable method, such as tanker trucks or pipelines, for example. In some embodiments, the input water W, which may be naturally acidic, neutral, or basic in terms of pH, may be passed from water tank 20 to a heater 30 in which it is heated to a suitable temperature, such as about 135° F., or about 110° F. to about 150° F., for example, and then blended with the drilling fluids DF for dilution as shown at 32. Such heating may help facilitate better blending of the input water W and drilling fluids DF and may help facilitate separation of water, oil, and solids as described further below. Alternatively, some embodiments may not include a heater 30. For example, in some embodiments, the input water W may include microorganisms and organic matter (either naturally or by addition), and sufficient heat may be generated by the microorganisms decomposing the organic matter during the process as described herein.

Still referring to FIG. 1, the blended mixture M of drilling fluids DF and input water W may be pumped from drilling fluid tank 10 into an oil/water separator 40, which is described further below. In some embodiments, drilling fluid tank 10 may have a sloped bottom that directs the blended mixture M toward a pump that feeds the blended mixture M to oil/water separator 40. In oil/water separator 40, the blended mixture M may be separated into oil, sludge, and water components. The oil may be skimmed from the top of the oil/water separator 40 and passed to an oil storage tank 50 as shown at 46 until such time as the oil may be sent to a further destination, such as a refinery, for example. The sludge may be removed from the bottom of the oil/water separator 40 and passed to a dryer 60 as shown at 42. In dryer 60, the remaining water in the sludge may be removed and passed back to drilling fluid tank 10 as shown at 62, and the dried solids S from the sludge may be output from dryer 60 and kept for any suitable use, such as road base material or fill, for example. The water (sometimes referred to herein as recovered water) may be passed from oil/water separator 40 to an aeration tank 70 as shown at 44 and described further below. In aeration tank 70, the water is aerated by any suitable means, such as diffused air introduced by one or more blowers through one or more diffusers, or aspirated air drawn into the water by a vacuum, for example. In some embodiments, aspirated air may be preferable due to reduced turbulence, which may better allow thermophilic microorganisms to propagate in the water and enhance the speed at which they decompose the organic materials that may be present in the water thereby generating more heat, which may enhance separation. From aeration tank 70, the water may be passed through a filter 80, which may remove some or all of the remaining particulates from the water. For example, a 10-20 micron filter or other suitable filter may be used. The filtered water may then be passed to a pasteurizer 90 for pasteurization. Alternatively, the water may be passed through pasteurizer 90 before being passed through filter 80. In any event, the process described above may yield filtered, pasteurized, recycled water RW, which may be stored in a storage tank 100 until such time as it may be needed for further use. For example, in some embodiments, recycled water RW may be reused for oilfield drilling or fracking operations or other industrial processes. In some embodiments, pasteurizer 90 may involve heating the fluids to a temperature that exceeds 165° F. for one or two minutes, for example, prior to cooling. This may allow about 99.9% kill on bacteria and viruses. The fluids may then be cooled prior to discharge through the use of heat exchange units where the fluids flow to the filtration process of filter 80.

In some embodiments, a truck washing station may be provided as part of the system described herein, which may allow for much greater efficiency of oilfield operations. For example, a tanker truck carrying a load of drilling fluids DF, or produced water or frac flowback input water W, may unload its drilling fluids DF or input water W into drilling fluid tank 10 or water tank 20, as the case may be. The tanker truck may then proceed to a washing station at which the recycled water RW may be used to wash out the tank of the tanker truck. The dirty water resulting from the tank cleaning process may be fed into drilling fluid tank 10, either directly or via water tank 20, for re-processing as part of blended mixture M as described above in connection with FIG. 1. After the tank of the tanker truck is cleaned, it may be reloaded with a fresh load of recycled water RW, which may be transported to an oilfield site for further use in drilling or fracking operations, for example.

Figure 2:
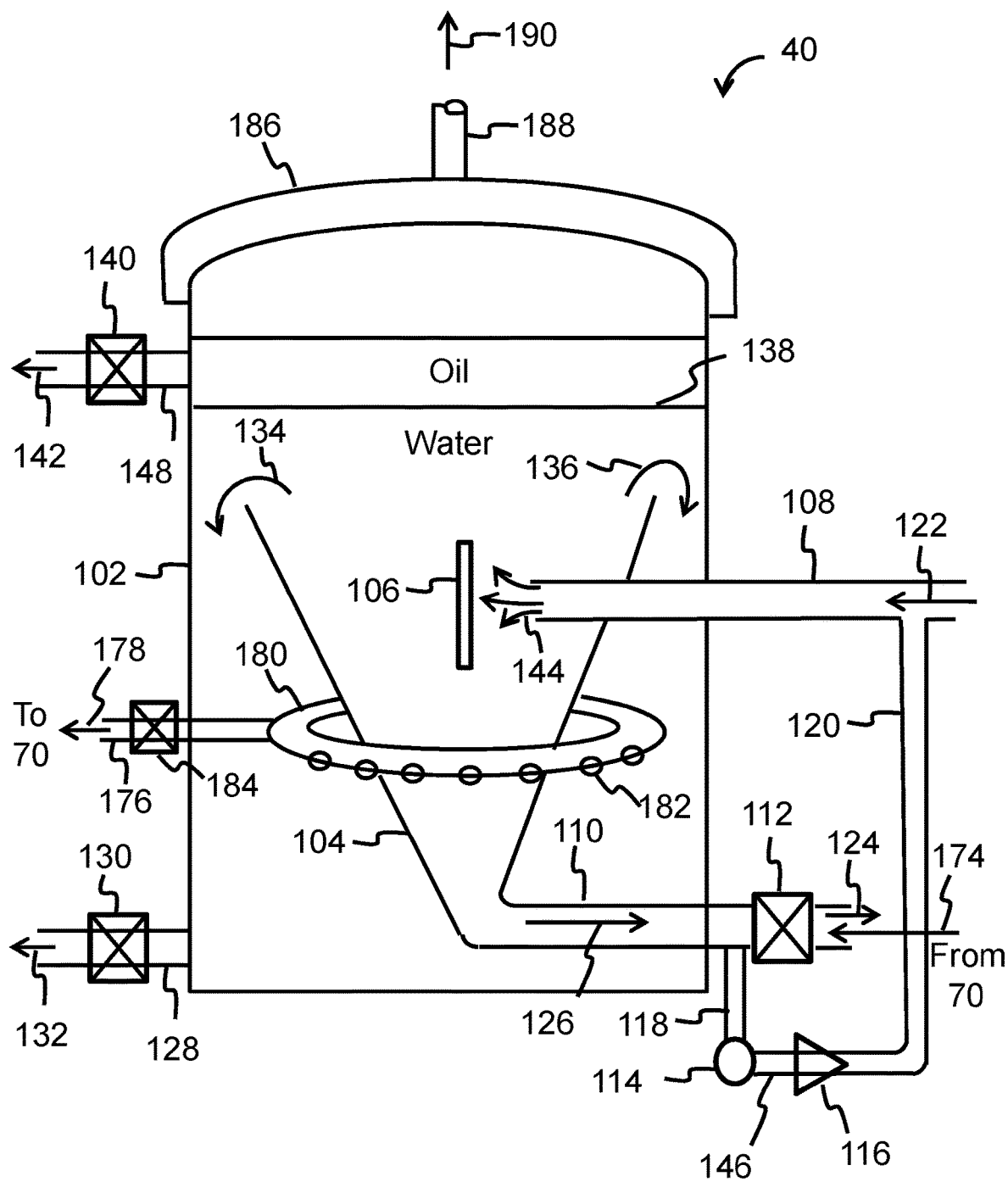
FIG. 2 is a schematic side elevational view of an oil/water separator.
Figure 4:
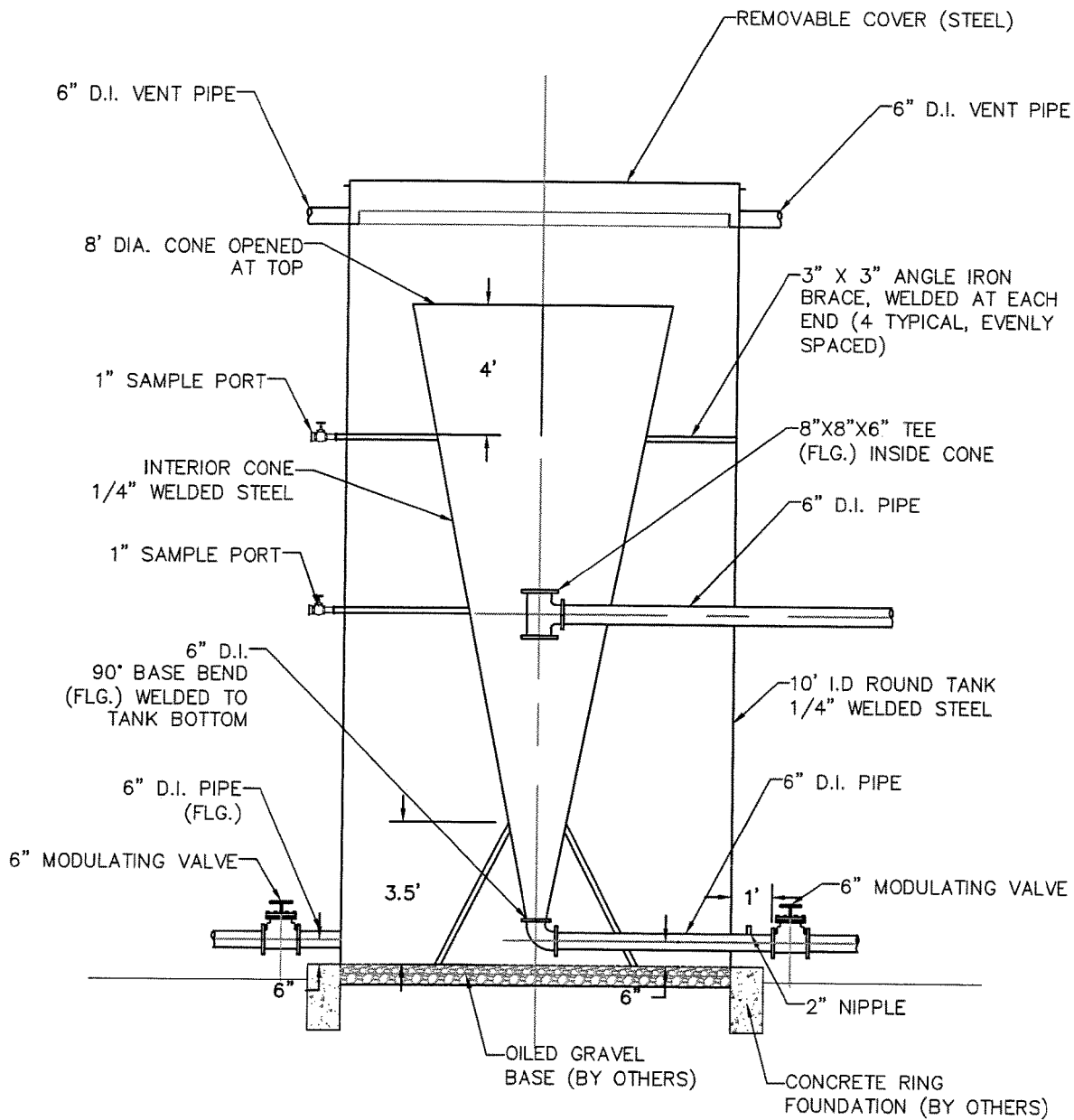
FIG. 4 is schematic side elevational view of an exemplary embodiment of an oil/water separator.

As shown in FIG. 2, oil/water separator 40 may have a tank 102 with an interior funnel 104 disposed therein. Funnel 104 may be substantially conical or of any suitable shape for directing sludge down toward sludge conduit 110 under the influence of gravity as described further below. An inlet conduit 108 may be configured for injecting the blended mixture M into oil/water separator 40 as shown at 122 and described above in connection with FIG. 1. As the blended mixture M enters the interior space of funnel 104 as shown at 144, a baffle 106 may cause the blended mixture M to begin to separate into oil, water, and sludge components. Due to gravity, the sludge components will tend to fall downward toward the bottom of funnel 104 and be passed into sludge conduit 110. The oil will tend to rise to the top of tank 102, and the water will be allowed to flow over the top rim of funnel 104 as shown at 134, 136 into the annular space between tank 102 and funnel 104. When the flow of blended mixture M through oil/water separator 40 reaches a steady state condition, little to no turbulence may be present in the vicinity of the oil/water boundary 138 (e.g., the fluids may be substantially still at that point), which helps keep the oil separated from the water. This design may also help reduce the likelihood of a "short circuit" of water flow within the oil/water separator 40 (from entry to exit), such that substantially all portions of the incoming blended mixture M realize substantially the same residence time within oil/water separator 40. In some embodiments, oil/water separator 40 may process about 150 to 200 gallons/minute of incoming blended mixture M. Of course, oil/water separator 40 may be sized to achieve any desired flow rate. This design may also reduce the amount of maintenance required and may substantially prevent the formation of $H_2S$ gas in the oil/water separator 40 because of the microorganism activity. The oil may be taken out of tank 102 through an oil exit conduit 148 as shown at 142. A valve 140 may be provided in oil exit conduit 148 to help regulate the flow of oil. The water may be taken out of tank 102 through a water exit conduit 128 as shown at 132, and a valve 130 may be provided in water exit conduit 128 to help regulate the flow of water. As shown at 126, the sludge may be passed out of tank 102 through sludge conduit 110. A valve 112 may be provided in sludge conduit 110 to help regulate the flow of sludge out of oil/water separator 40 as shown at 124. In some embodiments, a portion of sludge may be diverted from the sludge exit stream via conduit 118 and pump 114 in order to aerate the sludge by means of a venturi or other suitable aerator 116 and return the aerated sludge back to tank 102 via conduit 120, which feeds into inlet conduit 108. The sludge may have a pressure of about 9 psi at the inlet of pump 114, about 50 psi at the outlet of pump 114 (indicated at 146), and about 9 psi at the outlet of aerator 116, for example. Of course, other suitable pressures may be used, depending on the particular application. Such aeration may help facilitate further digestion of organic materials by microorganisms in the blended mixture M due to extended air contact stabilization of decomposing organic matter. Thus, in such embodiments, oil/water separator 40 may serve as a digester as well as a separator. A more detailed example of an oil/water separator is shown in FIG. 4. In some embodiments, such aeration may also help facilitate removal of hydrocarbons from the solids within funnel 104 of oil/water separator 40 by recycling aspirated air to wash the hydrocarbons from the solids contained within funnel 104. Additional treatment value may be realized through the anoxic value of the aspirated air that is introduced to oil/water separator 40. This may allow hydrophilic microbes to convert themselves to thermophilic, which may generate temperature as well as reduction of the time necessary for digestion of the nutrients contained in the fluids.

In light of that digester aspect, separator 40 may also be used to recycle wastewater. In a wastewater treatment embodiment, wastewater may enter separator 40 via inlet conduit 108, and separator 40 may function much like the manner described above for a blended mixture M, except that there may be no oil present. Sludge may be removed from the wastewater and extracted via sludge conduit 110, and water may be extracted via water exit conduit 128. Alternatively, the water may be extracted off the top of separator 40, such as via exit conduit 148. In some embodiments, a V-notch weir may be provided for the extracted water to flow over and into exit conduit 128 or 148. The extracted water may be further treated by aeration, filtration, and pasteurization as described above.

Oil/water separator 40 may be sized and configured for any desirable flow rates and residence times. For example, in some embodiments in which tank 102 has a diameter of about 10.0 ft. and a height of about 24.0 ft., a flow rate of about 200 gallons per minute (gpm) of blended mixture M may be achieved, with a residence time of the fluids in oil/water separator 40 of about 100 minutes. Oil/water separator 40 may be operated at any suitable temperature, such as about 135° F. to about 160° F., or about 140° F., for example. Of course, any suitable sizing, flow rate, and residence time may be utilized, depending on the particular fluid composition, pressure and temperature conditions, and other process variables.

Separator 40 may be used for any application requiring separation of an oil/water mixture. For example, separator 40 may be used to separate oil and water at tank batteries or collection stations at oil wells.

Referring again to FIG. 2, in some embodiments, oil/water separator 40 may have a cover 186 sealed on top of tank 102 in order to capture gases produced in tank 102. In such embodiments, oil/water separator 40 may serve as an anaerobic reactor. Cover 186 may be domed or pitched to help facilitate such gas capture and direct the gases toward a gas outlet 188, which may be regulated with a valve or other suitable gas flow regulator. Such gases may be discharged from tank 102 as shown at 190 and used to help power gas burning equipment included in system 200 (FIG. 1) or system 300 (FIG. 5) as described herein, such as heater 30 or dryer 60, for example, or other gas burning equipment. Thus, such gases may be put to beneficial use rather than simply being released or flared off to the atmosphere, for example, which makes systems 200, 300 more efficient and environmentally friendly. Additionally, inclusion of cover 186 may allow oil/water separator 40 to be located and operated inside a building, if desired.

As also shown in FIG. 2, in some embodiments, oil/water separator 40 may include one or more water collection tubes 180 disposed about funnel 104 in tank 102. Water collection tubes 180 may have one or more inlets 182 through which water may enter from tank 102. In some embodiments, inlets 182 may be disposed on an underside of a collection tube 180 in order to prevent or limit solids from falling into collection tube 180 as they fall downward in tank 102. Water may be extracted from the one or more collection tubes 180 via one or more conduits 176, which may be regulated by one or more valves 184, and passed to aeration tank 70 as indicated at 178. Such water collection tubes 180 and conduits 176 may be located at any suitable elevation within tank 102, such as approximately midway between the bottom and top, for example, and such an arrangement may help prevent or minimize short-circuiting of the flow of water from the inlets to the outlets of tank 102.

Figure 3:
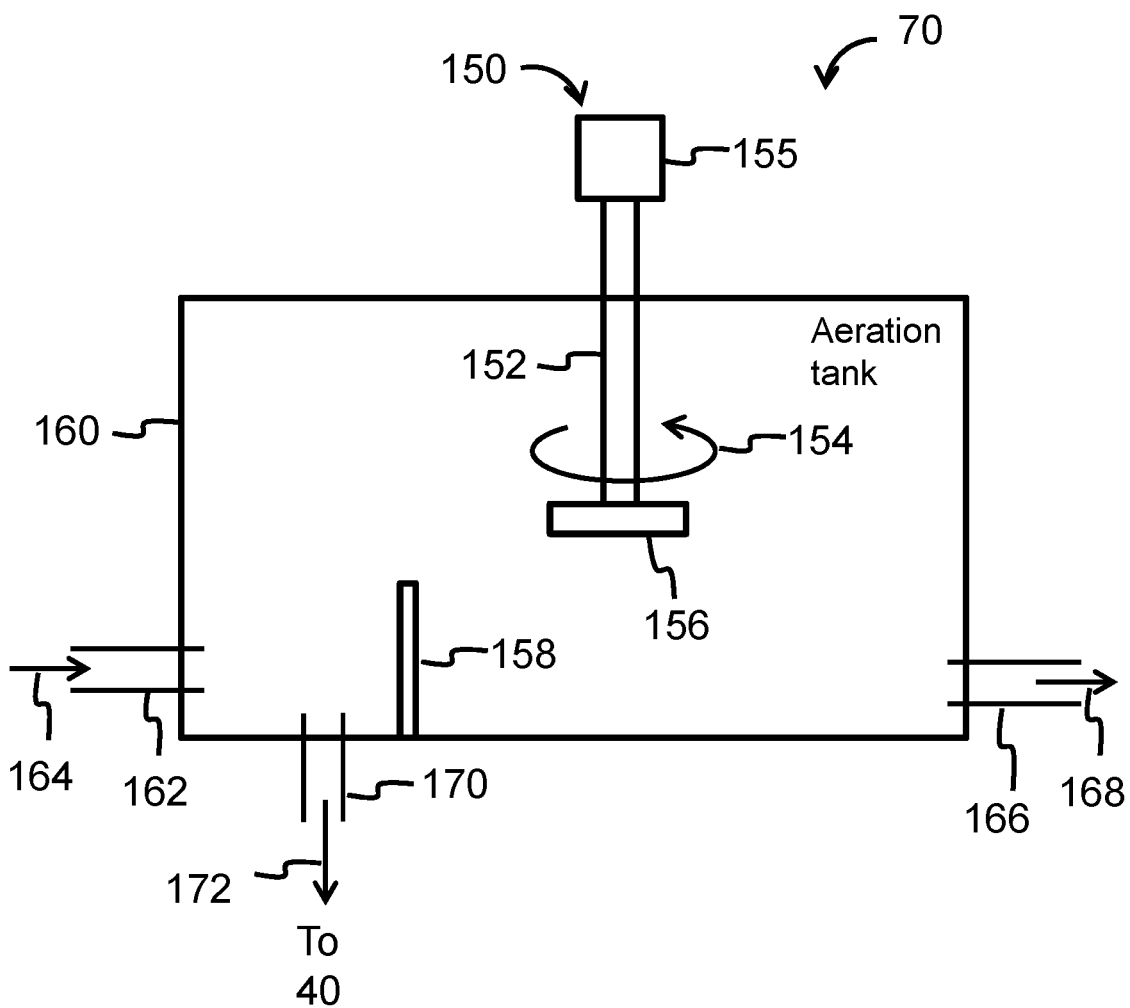
FIG. 3 is a schematic side elevational view of an aeration tank.

As shown in FIG. 3, in some embodiments, aeration tank 70 may include a tank 160 having an inlet 162 and an outlet 166. A baffle 158 may be provided near the inlet 162 to help break up the flow of the incoming water and avoid "short circuiting" the flow from the inlet 162 to the outlet 166. An aerator 150 may be mounted to tank 160. Any suitable aerator may be used. For example, aerator 150 may have a motor 155 that turns a rotating shaft 152 as shown at 154 and dispenses air into the water inside tank 160 via a rotating manifold 156 connected to shaft 152. For example, aerator 150 may be a FracCure™ turbine aerator available from FracCure, LLC (Wimberley, Tex.). In some embodiments, water may be intermittently or periodically pulled from a bottom region of tank 160 via a conduit 170 and sent to sludge conduit 110 of oil/water separator 40 as shown at 172 (see also arrow 174 in FIG. 2) in a countercurrent manner via a pump in order to clean out sludge conduit 110 and prevent it from being clogged. Such countercurrent anti-clogging water injection into sludge conduit 110 may also help break up and expand the surface area of solids in funnel 104, which may enhance the separation of oil from the solids and help raise the oil/water boundary 138 sufficient to permit the skimming of oil from the top of oil/water separator 40 via oil exit conduit 148.

Referring again to FIG. 1, in some embodiments, system 200 may be used to process a blended mixture M of oilfield drilling fluids DF and input water W as described herein to yield recycled water RW that is substantially bacteria-free clean brine water. Such brine water may be substantially free of hydrocarbons and suspended and dissolved solids (e.g., at least about 95% pure or better in those respects) but may have one or more salts remaining therein (e.g., chlorides, fluorides, sulfates, acetates, and/or other salts). The particular remaining salts and their concentrations in the recycled water RW may be dependent on the composition of the particular oilfield drilling fluids DF and input water W that are put into system 200. Oil/water separator 40 may remove excess minerals, metals, and volatile organics from the mixture M to a first purity level; aeration tank 70 may further remove such minerals, metals, and volatile organics from the recovered water to a second purity level via oxidation and equalization; and filter 80 may further remove such minerals, metals, and volatile organics from the recovered water to a third purity level via filtration. Heater 30 may help facilitate the killing or inactivation of bacteria present in the input water W, and pasteurizer 90 may help facilitate the killing or inactivation of bacteria present in the recovered water. In addition to or in lieu of pasteurizer 90, the recovered water may be passed through one or more other devices that may serve to kill or inactivate bacteria that may be present in the recovered water, such as a UV light source, sanitizer, or heater, for example, such that the resulting brine water RW may be substantially free of active bacteria (e.g., at least about 99% free or up to 10% free of active bacteria). The resulting brine water RW may be heavier (e.g., about 9 to 10 pounds/gallon) than pure water, which is about 8.3 pounds/gallon, and may be "slick" (i.e., having calcium and magnesium content reduced to drinking water levels, wherein metals, minerals, and organic volatiles have been substantially precipitated out). With such heavier weight and "slick" characteristics, the resulting brine water RW may be very useful for fracking and well re-working operations because it may require less amounts of gels and other chemicals that are typically added to water for use in such operations. Thus, such resulting brine water RW may yield significant energy and cost savings in such fracking and re-working operations and may be significantly more environmentally friendly than typical fracking and re-working fluids.

Figure 5:
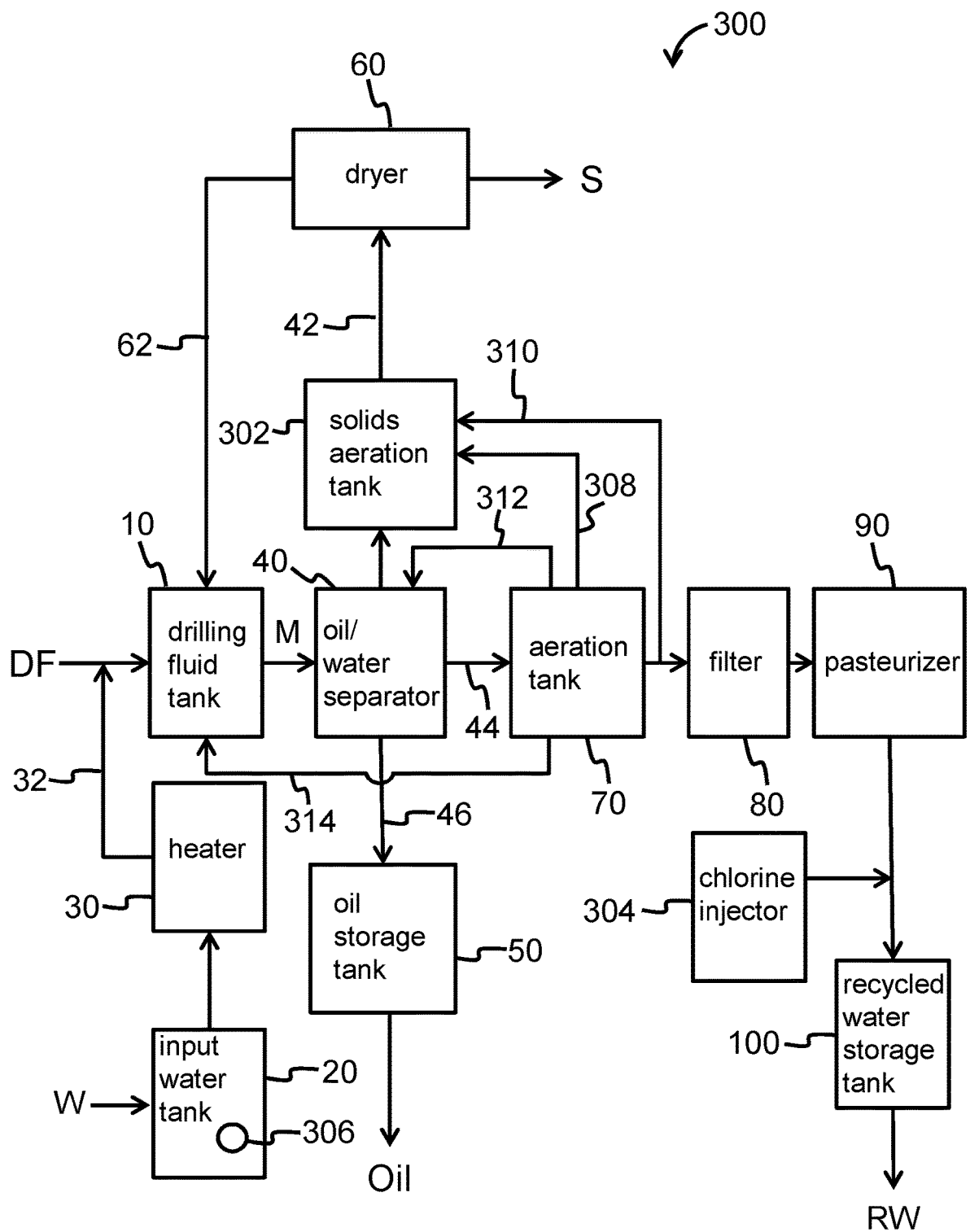
FIG. 5 is a schematic diagram illustrating another method and apparatus for collecting, treating, and recycling oilfield drilling fluids, produced water, and frac flow back water.

Referring to FIG. 5, a system 300 is shown which is similar to system 200 of FIG. 1, except that system 300 also has a solids collection aeration tank 302 and a chlorine injector 304. In some embodiments, system 300 may also have an additional aerator 306 included within input water tank 20 to help condition the input water W prior to being fed into heater 30. In system 300, remaining solids (e.g., sediment) may be extracted from the bottom of aeration tank 70 and passed to solids aeration tank 302 as indicated at 308, and a portion of the water from aeration tank 70 may be fed into solids aeration tank 302 as shown at 310 in order to wash out any remaining hydrocarbons from the solids before they are sent to dryer 60. In some embodiments, sediment may also be sent from aeration tank 70 to oil/water separator 40 as shown at 312 and/or drilling fluid tank 10 as shown at 314 for further processing in oil/water separator 40. Such sediment may contain various metals, such as iron, molybdenum, zinc, and the like, for example, which have precipitated out of the input fluids and may help stimulate methane production in oil/water separator 40. Injector 304 may inject free active chlorine, such as Envirolyte™ products available from Envirolyte Industries International Ltd. (Tallinn, Estonia), for example, into the recycled water RW in suitable amounts in order to guard against the proliferation of bacteria therein.

In some embodiments, the water and possibly other supernate fluids may be transferred by gravity from oil/water separator 40 to aeration tank 70 for further treatment as described herein. Intermittent aeration may allow settled solids to be pumped off and recycled to either solids aeration tank 302 for mixing with receiving fluids therein and/or introduction into the solids removal process of the interior of funnel 104 of oil/water separator 40 as described above. From aeration tank 70, the aerated fluids may be transferred by way of a pump to filter 80, pasteurizer 90, and recycled water storage tank 100.

The embodiments described above are some examples of the current invention. Various modifications and changes of the current invention will be apparent to persons of ordinary skill in the art. Among other things, any feature described for one embodiment may be used in any other embodiment. The scope of the invention is defined by the appended claims and other claims that may be drawn to this disclosure, considering the doctrine of equivalents, and is not limited to the specific examples described herein.

What is claimed is:

1. A method of collecting and treating oilfield drilling fluids and used oilfield water to produce treated, recovered water suitable for reuse in oilfield drilling, comprising:
    collecting the oilfield drilling fluids;
    collecting the used oilfield water as input water;
    blending said input water with said oilfield drilling fluids to form a blended mixture;
    transferring said blended mixture into an oil/water separator also serving as an anaerobic digester;
    separating said blended mixture into oil, recovered water, and sludge using said oil/water separator;
    removing at least some of said oil from a top portion of said oil/water separator;
    removing at least some of said sludge from a bottom portion of said oil/water separator in a sludge exit stream;
    aerating a portion of said sludge exit stream to form aerated sludge;
    transferring at least some of said recovered water from said oil/water separator to an aeration tank;
    returning said aerated sludge and sediment extracted from said aeration tank to said oil/water separator to facilitate digestion of organic materials by microorganisms in said blended mixture and removal of hydrocarbons from solids in said blended mixture;
    filtering said recovered water using a filter; and killing or inactivating bacteria in said recovered water to provided the treated, recovered water ready for use in oilfield drilling.

2. The method of claim 1 wherein said returning said aerated sludge and said sediment to said oil/water separator comprises recycling aspirated air to wash the hydrocarbons from said solids contained within said oil/water separator.

3. The method of claim 2 wherein said aspirated air has an anoxic value suitable to promote conversion of microbes to thermophilic the microorganisms, whereby the thermophilic microbes generate temperature reducing the time necessary for said digestion of said organic materials contained in the blended mixture.

4. The method of claim 3 wherein said oil/water separator comprises a funnel disposed within an oil/water separator tank, an inlet conduit configured for injecting said blended mixture and said sediment and said aerated sludge into said funnel, said funnel having an open top rim spaced apart from an interior wall of said oil/water separator tank and a narrowing bottom connecting to a sludge exit conduit, said method further comprising:
    allowing said recovered water to flow over said open top rim, downward into an annular space between said funnel and said interior wall of said oil/water separator tank, and out of said oil/water separator through a water exit conduit; and
    allowing said aerated sludge to fall downward toward the narrowing bottom of said funnel and into said sludge exit conduit.

5. The method of claim 4 further comprising processing said blended mixture through said oil/water separator at rate of about 150 to 200 gallons/minute.

6. The method of claim 5 wherein said blended mixture has a residence time in said oil/water separator of about 100 minutes.

7. The method of claim 4, wherein said digestion said organic materials by said microorganisms substantially prevents formation of $H_2S$ gas in said oil/water separator.

8. The method of claim 4 wherein said oil/water separator further comprises a cover sealed to a top of said oil/water separator tank, said method further comprising:
    capturing gases produced in said oil/water separator tank under said cover;
    discharging said gases from said oil/water separator tank through a gas outlet; and
    using said gases to power gas burning equipment.

9. The method of claim 1 wherein aerating said recovered water in said aeration tank is performed using aspirated air which allows said thermophilic microbes to propagate in said recovered water and enhance a speed at which said thermophilic microbes decompose said organic materials thereby generating heat and enhancing separation of particulates from said recovered water.

10. A method of collecting and treating oilfield drilling fluids and used oilfield water to produce treated, recovered water suitable for reuse in oilfield drilling and to produce one or more dried solids, comprising:
    collecting the oilfield drilling fluids;
    collecting the used oilfield water as input water;
    blending said input water with said oilfield drilling fluids to form a blended mixture;
    transferring said blended mixture into an oil/water separator also serving as an anaerobic digester;
    separating said blended mixture into oil, recovered water, and sludge using said oil/water separator;
    removing at least some of said oil from a top portion of said oil/water separator;
    removing at least some of said sludge from a bottom portion of said oil/water separator in a sludge exit stream via a sludge exit conduit;
    diverting a portion of said sludge exit stream from said sludge exit conduit;
    aerating said portion of said sludge exit stream to form aerated sludge;
    removing at least some of said recovered water from said oil/water separator to a first aeration tank;
    aerating said recovered water in said first aeration tank;
    routing sediment extracted from said first aeration tank to said oil/water separator;
    returning said sediment and said aerated sludge to said oil/water separator to facilitate both digestion of organic materials by microorganisms in said blended mixture and removal of hydrocarbons from solids in said blended mixture;
    passing a portion of said recovered water from said first aeration tank to a second aeration tank, and collecting sediment from said second aeration tank;
    passing at least some of said sediment from said second aeration tank to a dryer in order to produce the one or more dried-solids;
    filtering said recovered water using a filter; and
    killing or inactivating bacteria in said recovered water to provide the treated, recovered water ready for use in oilfield drilling.

11. The method of claim 10 wherein, after being processed through said first aeration tank and said filter, said recovered water comprises brine water that is substantially free of the hydrocarbons and suspended and dissolved solids but has one or more salts remaining therein.

12. The method of claim 11 wherein said brine water is suitable for reuse in oilfield fracking or re-working operations.

13. The method of claim 11 wherein said brine water is at least about 95% pure with respect to the hydrocarbons and the suspended and dissolved solids.

14. The method of claim 10 wherein, after said killing or inactivating, said treated, covered water is at least about 99% free of active bacteria.

15. The method of claim 10 wherein said oil/water separator removes at least one of minerals, metals, and volatile organics from said blended mixture to a first purity level.

16. The method of claim 15 wherein said aeration removes at least one of said minerals, metals, and volatile organics from said recovered water to a second purity level.

17. The method of claim 16 wherein said filter removes at least one of said minerals, metals, and volatile organics from said recovered water to a third purity level.

18. The method of claim 11 wherein said brine water has a weight greater than 8.3 pounds/gallon.

19. The method of claim 18 wherein said brine water has a weight of about 9 to 10 pounds/gallon.

20. The method of claim 10 further comprising extracting a portion of said recovered water from said first aeration tank and injecting said portion of said recovered water from said first aeration tank into said sludge exit conduit of said oil/water separator in a countercurrent configuration.

* * * * *

UNITED STATES PATENT AND TRADEMARK OFFICE
CERTIFICATE OF CORRECTION

PATENT NO. : 10,724,314 B1  
APPLICATION NO. : 16/109563  
DATED : July 28, 2020  
INVENTOR(S) : Dale Ross Yates It is certified that error appears in the above-identified patent and that said Letters Patent is hereby corrected as shown below:

In the Claims

In Column 9, Line 2, Claim 1, delete "provided" and insert --provide-- therefor.

In Column 10, Line 42, Claim 14, delete "covered" and insert --recovered-- therefor.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*